Patented Jan. 29, 1935

1,989,472

UNITED STATES PATENT OFFICE 1,989,472

AZODYESTUFF

Heinrich Clingestein, Cologne-on-the-Rhine, and Myrtil Kahn, Cologne-Riehl, Germany, assignors to General Aniline Works, Inc., New York, N. Y., a corporation of Delaware No Drawing. Application June 29, 1933, Serial No. 678,312. In Germany July 26, 1932

4 Claims. (Cl. 260—72)

The present invention relates to new azodyestuffs. More particularly it relates to dyestuffs which may be represented by the probable general formula:

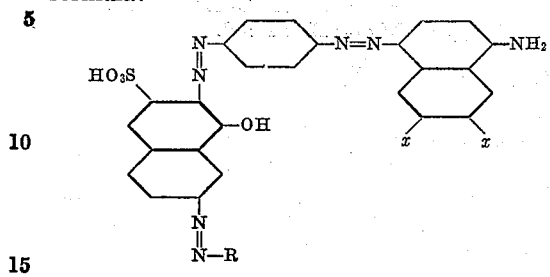

wherein one $x$ stands for a sulfonic acid group, the other $x$ stands for hydrogen, and R stands for the radical of a m-arylenediamine being at least once substituted in one amino group by a hydroxyalkyl group, for example R may stand for the radical of m-phenylenediamine which is substituted in one amino group by hydroxymethyl, hydroxyethyl, hydroxypropyl, a glycol radical, a glycerine radical and the like, or for a m-phenylenediamine containing in each amino group one of the afore-mentioned substituents, or in which the two hydrogen atoms of one amino group are substituted by these substituents.

Our new dyestuffs can be prepared by monodiazotizing the diaminodisazodyestuff, obtainable by saponifying or reducing respectively the monoazodyestuff from diazotized 1-amino-4-acetylamino- or -4-nitrobenzene respectively and 1-aminonaphthalene-6- or -7-sulfonic acid, monodiazotizing and coupling with 2-amino-8-hydroxynaphthalene-6-sulfonic acid in alkaline solution, mono-diazotizing and coupling with a m-arylenediamine being at least once substituted in one amino group by a hydroxyalkyl group.

Our new dyestuffs are in form of their alkali metal salts generally dark powders, soluble in water, dyeing cotton generally full black shades of good fastness properties.

The invention is illustrated by the following example, without being limited thereto:

*Example.*—32.4 parts by weight of the aminoazodyestuff prepared by saponifying the dyestuff from diazotized 1-amino-4-acetylaminobenzene and 1-aminonaphthalene-6- (-7) sulfonic acid or by reducing the corresponding azodyestuff prepared by means of 1-amino-4-nitrobenzene as diazotization component are diazotized in the usual manner with 6.9 parts by weight of sodium nitrite and hydrochloric acid and coupled with 23.9 parts by weight of 2-amino-8-hydroxynaphthalene-6-sulfonic acid in alkaline solution. The dyestuff formed is salted out, pressed, pasted with water and ice, then 25 parts by weight of sulfuric acid of 40° Bé. are added, and diazotization is performed by the addition of 6.9 parts by weight of sodium nitrite. The diazotization mixture is then added to a soda-alkaline solution of 16 parts by weight of 1-hydroxyethylamino-3-aminobenzene. When the coupling is complete, some salt is added and the mass is filtered, pressed and dried. The dyestuff contains the free amino group in the naphthalene nucleus which bears no hydroxy group. In its free state the dyestuff corresponds to the following probable formula:

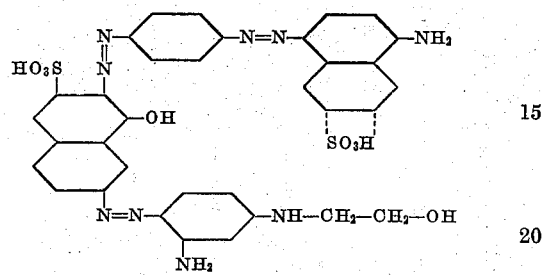

We claim:
1. Azodyestuffs having in the free state the following formula:

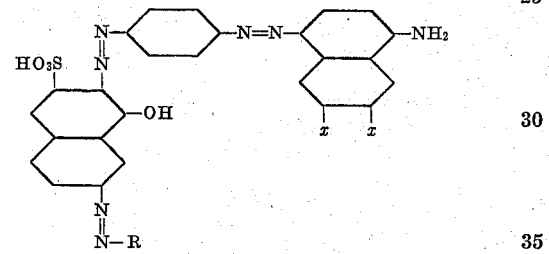

wherein one $x$ stands for a sulfonic acid group, the other $x$ stands for hydrogen, and R stands for the radical of a m-arylenediamine being at least once substituted in one amino group by a hydroxyalkyl group, being in form of their alkali metal salts generally dark powders, soluble in water, dyeing cotton generally full black shades of good fastness properties.

2. Azodyestuffs having in the free state the following formula:

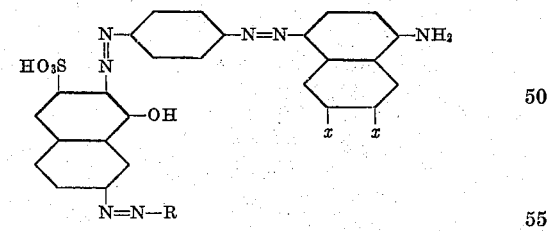

wherein one $x$ stands for a sulfonic acid group, the other $x$ stands for hydrogen, and R stands for the radical of a m-phenylenediamine being at least once substituted in one amino group by a hydroxyalkyl group, being in form of their alkali metal salts generally dark powders, soluble in water, dyeing cotton generally full black shades of good fastness properties.

3. Azodyestuffs having in the free state the following formula:

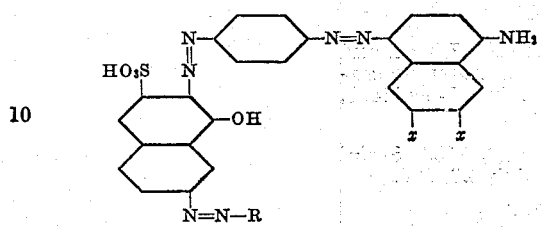

wherein one $x$ stands for a sulfonic acid group, the other $x$ stands for hydrogen, and R stands for the radical of a m-phenylenediamine being at least once substituted in one amino group by a hydroxyethyl group, being in form of their alkali metal salts generally dark powders, soluble in water, dyeing cotton generally full black shades of good fastness properties.

4. The azodyestuff having in the free state the formula:

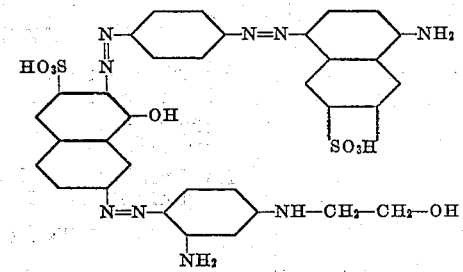

being in form of its alkali metal salts a dark powder, dyeing cotton full black shades of good fastness properties.

HEINRICH CLINGESTEIN.
MYRTIL KAHN.